United States Patent
Qiu et al.

(10) Patent No.: US 10,908,960 B2
(45) Date of Patent: Feb. 2, 2021

(54) RESOURCE ALLOCATION BASED ON COMPREHENSIVE I/O MONITORING IN A DISTRIBUTED STORAGE SYSTEM

(71) Applicant: Alibaba Group Holding Limited, Grand Cayman (KY)

(72) Inventors: Sheng Qiu, Sunnyvale, CA (US); Fei Liu, Sunnyvale, CA (US); Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/385,955

(22) Filed: Apr. 16, 2019

(65) Prior Publication Data
US 2020/0334085 A1   Oct. 22, 2020

(51) Int. Cl.
*G06F 9/50* (2006.01)
*G06F 11/30* (2006.01)
*G06F 3/06* (2006.01)

(52) U.S. Cl.
CPC .......... *G06F 9/5016* (2013.01); *G06F 3/0611* (2013.01); *G06F 3/0619* (2013.01); *G06F 3/0638* (2013.01); *G06F 3/0679* (2013.01); *G06F 11/3006* (2013.01); *G06F 11/3034* (2013.01)

(58) Field of Classification Search
CPC .... G06F 9/0516; G06F 3/0611; G06F 3/0619; G06F 3/0638; G06F 3/0679; G06F 3/0683; G06F 3/0604; G06F 3/061; G06F 3/0614; G06F 3/0617; G06F 3/0653; G06F 3/067; G06F 11/3006; G06F 11/3034; G06F 11/30; G06F 9/5016
See application file for complete search history.

(56) References Cited

U.S. PATENT DOCUMENTS

| 3,893,071 A | 7/1975 | Bossen |
| 4,718,067 A | 1/1988 | Peters |

(Continued)

FOREIGN PATENT DOCUMENTS

| WO | 9418634 | 8/1994 |
| WO | 1994018634 | 8/1994 |

OTHER PUBLICATIONS

Tsuchiya, Yoshihiro et al. "DBLK: Deduplication for Primary Block Storage", MSST 2011, Denver, CO, May 23-27, 2011 pp. 1-5.

(Continued)

*Primary Examiner* — Tracy A Warren
(74) *Attorney, Agent, or Firm* — Shun Yao; Park, Vaughan, Fleming & Dowler LLP

(57) ABSTRACT

Embodiments described herein provide a storage management system. During operation, the system receives information indicating sets of pending load of a plurality of storage devices from one or more storage nodes of a distributed storage system. The set of pending load of a respective storage device includes a set of load from host operations and a set of load from background operations on the storage device. The system can receive a request for a target resource associated with a disk operation from a client node of the distributed storage system. The system then selects, from the plurality of storage devices, a storage device with the smallest set of pending load based on the sets of pending load as the target resource and sends the target resource to the client node.

20 Claims, 12 Drawing Sheets

(56) References Cited

U.S. PATENT DOCUMENTS

| | | |
|---|---|---|
| 4,775,932 A | 10/1988 | Oxley |
| 5,394,382 A | 2/1995 | Hu |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,280,472 B1 | 3/2016 | Dang |
| 9,280,487 B2 | 3/2016 | Candelaria |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,747,202 B1 | 8/2017 | Shaharabany |
| 9,852,076 B1 | 12/2017 | Garg |
| 9,875,053 B2 * | 1/2018 | Frid ............... G06F 3/0604 |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 * | 6/2019 | Barzik ............ G06F 13/4221 |
| 10,437,670 B1 | 10/2019 | Koltsidas |
| 10,649,657 B2 | 5/2020 | Zaidman |
| 2001/0032324 A1 | 10/2001 | Slaughter |
| 2002/0010783 A1 | 1/2002 | Primak |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0089544 A1 | 4/2009 | Liu |
| 2009/0113219 A1 | 4/2009 | Aharonov |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 * | 7/2012 | Lassa ............... G06F 3/0659 711/103 |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0238955 A1 | 9/2013 | D Abreu |
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0227316 A1 | 8/2015 | Warfield |
| 2015/0234845 A1 | 8/2015 | Moore |

(56) References Cited

U.S. PATENT DOCUMENTS

| | | |
|---|---|---|
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077968 A1 | 3/2016 | Sela |
| 2016/0098344 A1 | 4/2016 | Gorobets |
| 2016/0098350 A1 | 4/2016 | Tang |
| 2016/0110254 A1 | 4/2016 | Cronie |
| 2016/0154601 A1 | 6/2016 | Chen |
| 2016/0162187 A1 | 6/2016 | Lee |
| 2016/0179399 A1 | 6/2016 | Melik-Martirosian |
| 2016/0188223 A1 | 6/2016 | Camp |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010502 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1* | 6/2017 | Kanno ............ G06F 3/061 |
| 2017/0177259 A1 | 6/2017 | Motwani |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1* | 2/2018 | Barzik ............ G06F 3/0613 |
| 2018/0088867 A1 | 3/2018 | Kaminaga |
| 2018/0107591 A1 | 4/2018 | Smith |
| 2018/0143780 A1 | 5/2018 | Cho |
| 2018/0167268 A1 | 6/2018 | Liguori |
| 2018/0173620 A1 | 6/2018 | Cen |
| 2018/0188970 A1* | 7/2018 | Liu ............ G06F 3/0653 |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0356992 A1 | 12/2018 | Lamberts |
| 2018/0373428 A1 | 12/2018 | Kan |
| 2018/0373655 A1* | 12/2018 | Liu ............ G06F 13/30 |
| 2018/0373664 A1 | 12/2018 | Vijayrao |
| 2019/0012111 A1 | 1/2019 | Li |
| 2019/0073262 A1 | 3/2019 | Chen |
| 2019/0087115 A1 | 3/2019 | Li |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1* | 1/2020 | Williams ............ G06F 3/0653 |
| 2020/0004674 A1* | 1/2020 | Williams ............ G06N 20/00 |
| 2020/0097189 A1 | 3/2020 | Tao |

OTHER PUBLICATIONS

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

\* cited by examiner

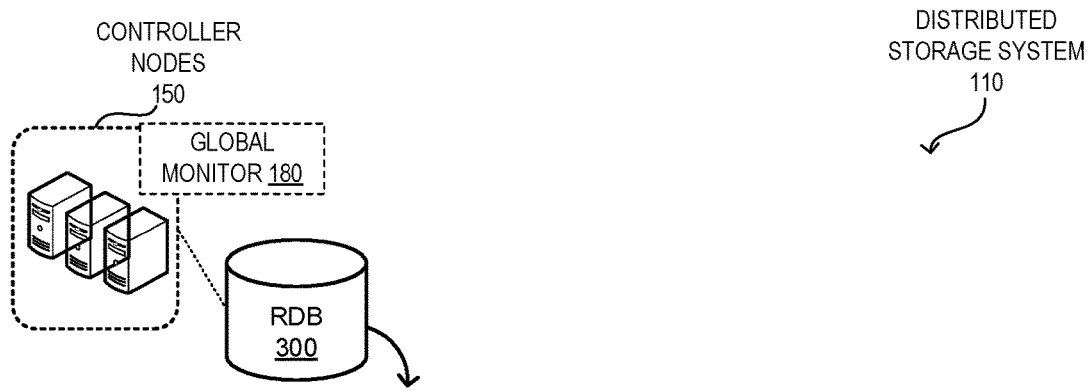

| RESOURCE STATISTICS TABLE 190 | | | |
|---|---|---|---|
| RACK 302 | NODE 304 | STORAGE DEVICE 306 | RESOURCE STATS 308 |
| RACK 312 | NODE 112 | STORAGE DEVICE 204 | HOST W/R 322, BACKGROUND W/R 324 |
| | | STORAGE DEVICE 206 | HOST W/R, BACKGROUND W/R |
| | | STORAGE DEVICE 208 | HOST W/R, BACKGROUND W/R |
| | NODE 114 | STORAGE DEVICE 214 | HOST W/R 326, BACKGROUND W/R 328 |
| | | STORAGE DEVICE 216 | HOST W/R, BACKGROUND W/R |
| | | STORAGE DEVICE 218 | HOST W/R, BACKGROUND W/R |
| | ... | ... | ... |
| RACK 314 | NODE 116 | STORAGE DEVICE 144 | HOST W/R 341: 16 MB/32 MB BACKGROUND W/R 342: 128 MB/128 MB |
| | | STORAGE DEVICE 146 | HOST W/R 343: 64 MB/64 MB BACKGROUND W/R 344: 32 MB/16 MB |
| | | STORAGE DEVICE 148 | HOST W/R 345: 32 MB/32 MB BACKGROUND W/R 346: 64 MB/64 MB |
| | ... | ... | ... |
| ... | ... | ... | ... |

FIG. 3

RESOURCE ALLOCATION BASED ON COMPREHENSIVE I/O MONITORING IN A DISTRIBUTED STORAGE SYSTEM

BACKGROUND

Field

This disclosure is generally related to the field of storage management. More specifically, this disclosure is related to a system and method for allocating resources based on comprehensive input/output (I/O) monitoring in a distributed storage system.

Related Art

A variety of applications running on physical and virtual devices have brought with them an increasing demand for computing resources. As a result, equipment vendors race to build larger and faster computing equipment (e.g., processors, storage, memory devices, etc.) with versatile capabilities. However, the capability of a piece of computing equipment cannot grow infinitely. It is limited by physical space, power consumption, and design complexity, to name a few factors. Furthermore, computing devices with higher capability are usually more complex and expensive. More importantly, because an overly large and complex system often does not provide economy of scale, simply increasing the size and capability of a computing device to accommodate higher computing demand may prove economically unviable.

With the increasing demand for computing, the demand for high-capacity storage devices is also increasing. Such a storage device typically needs a storage technology that can provide large storage capacity as well as efficient storage/retrieval of data. One such storage technology can be solid-state drives (SSDs), which are typically Not AND (NAND) flash memory devices (or flash devices). SSDs can provide high capacity storage at a low cost. As a result, SSDs have become the primary competitor of traditional hard disk drives (HDDs) as a persistent storage solution.

Consequently, SSDs are widely used in distributed storage systems, such as datacenters, due to the enhanced performance of SSDs. However, an SSD can face unstable performance and may incur long tail latency. In particular, if the SSD's background I/O operations, such as garbage collection operation, are competing with the host device's I/O operations, the performance of the SSD can be compromised. Moreover, background I/O operations of an SSD may not be accessible by the host device. As a result, the host device may not be able to determine the overall I/O operations for the SSD.

Even though SSDs have brought many desirable features to a distributed storage system, many problems remain unsolved in efficient resource allocation in the distributed storage system.

SUMMARY

Embodiments described herein provide a storage management system. During operation, the system monitors a storage device of a computing device in a distributed storage system. The system can determine a set of pending load on the storage device based on the monitoring. The set of pending load can include a set of load from host operations and a set of load from background operations on the storage device. The system then sends information indicating the set of pending load for distributing incoming requests in the distributed storage system.

In a variation on this embodiment, the storage device includes a number of storage dies coupled to each other via internal channels. The system determines sets of load from host operations and background operations on a respective storage die of the number of storage dies.

In a variation on this embodiment, the set of pending load indicates input/output (I/O) bytes for pending read and write operations on the storage device.

In a variation on this embodiment, the background operations include one or more of: a garbage collection operation, data synchronization, and health check of data in the distributed storage system.

In a variation on this embodiment, the system determines a second set of pending load on a second storage device of the computing device and sends information indicating the second set of pending load for distributing incoming requests in the distributed storage system.

In a variation on this embodiment, the storage device is an open-channel solid-state drive (SSD). The monitoring of the storage device can include monitoring the host operations and the background operations managed by a device driver of the storage device.

Embodiments described herein provide a storage management system. During operation, the system receives sets of pending load of a plurality of storage devices from one or more storage nodes of a distributed storage system. The set of pending load of a respective storage device includes a set of load from host operations and a set of load from background operations on the storage device. The system can receive a request for a target resource associated with a disk operation from a client node of the distributed storage system. The system then selects, from the plurality of storage devices, a storage device with a smallest set of pending load in the sets of pending load as the target resource and sends the target resource to the client node.

In a variation on this embodiment, the system selects the storage device by determining that the storage device and a second storage device have the smallest set of pending load, comparing sets of pending load of storage dies of the storage device and the second storage device, and randomly selecting the storage device as the target resource in response to detecting a tie in the comparison.

In a variation on this embodiment, the background operations include one or more of: a garbage collection operation, data synchronization, and health check of data in the distributed storage system.

In a variation on this embodiment, the disk operation is a read operation for a piece of data. The target resource can then indicate a source location of at least one replica of the piece of data in the distributed storage system.

In a variation on this embodiment, the disk operation is a write operation for a piece of data. The target resource can then indicate a destination location of at least one replica of the piece of data in the distributed storage system.

In a variation on this embodiment, the system hierarchically determines sets of pending load on entities of the distributed storage system from the sets of pending load of the plurality of storage devices.

In a variation on this embodiment, a respective storage device of the plurality of storage devices includes a number of storage dies coupled to each other via internal channels. The sets of pending load of the plurality of storage devices can then include sets of load from host operations and background operations on a respective storage die of the number of storage dies.

BRIEF DESCRIPTION OF THE FIGURES

FIG. 3 illustrates an exemplary resource mapping table storing comprehensive resource statistics in a distributed storage system, in accordance with an embodiment of the present application.

In the figures, like reference numerals refer to the same figure elements.

DETAILED DESCRIPTION

Figure 1A:
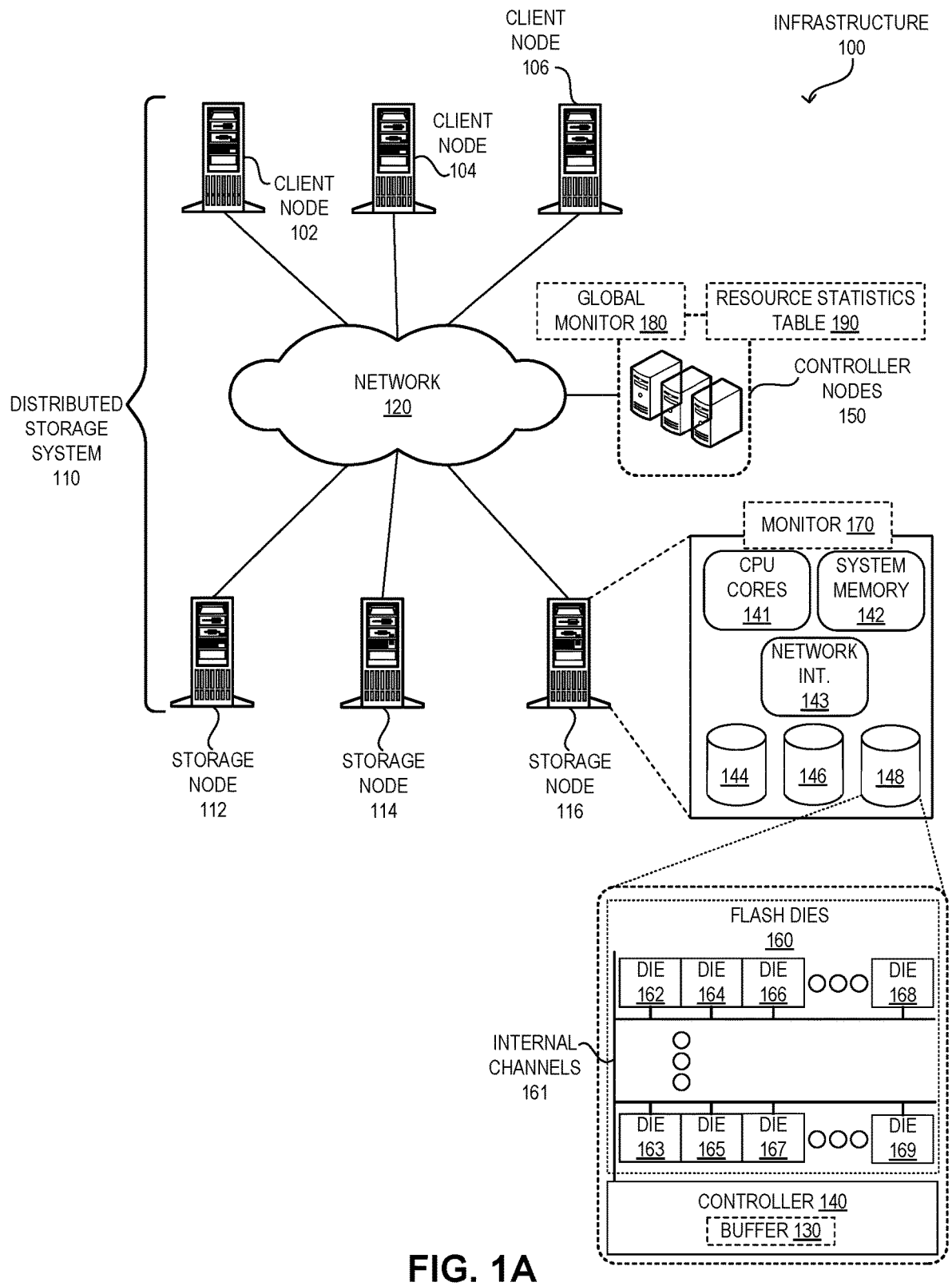
FIG. 1A illustrates an exemplary infrastructure facilitating efficient resource allocation based on comprehensive I/O monitoring in a distributed storage system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently allocating resources for I/O operations in a distributed storage system by (i) comprehensively monitoring both host and background I/O operations at the internal channels of an SSD; and (ii) periodically notifying one or more controller nodes regarding the monitored information. The periodic notification allows the controller nodes to maintain comprehensive records of resource statistics (e.g., pending I/O operations and associated bytes) in the distributed storage system. The resource statistics of a storage device can indicate the current runtime resource consumption on that storage device.

Typically, the architecture of the system includes a number of client nodes (or compute nodes), storage nodes, and controller nodes. The client nodes receive the client data and corresponding requests. On the other hand, the storage nodes store the data. To facilitate high availability and high reliability, each piece of data can be stored in multiple storage nodes and/or storage devices. Controller nodes can store and organize the metadata associated with the storage operations and the data stored. The term "storage device" can refer to a device with non-volatile memory configured to store data through a power cycle (e.g., if the host device of the storage device is turned off and, subsequently, on again). For a client node, which can also be referred to as a compute node, the storage device can be any non-volatile media. On the other hand, for a storage node, the storage device can be a solid-state drive (SSD) comprising a number of storage cells. For example, a single-level cell (SLC) of the SSD can store one bit, while a quad-level cell (QLC) can store four bits.

With existing technologies, the system can monitor I/O loads on storage devices, such as SSDs, of the system to allocate resources so that the client nodes can perform read and/or write operations. Typically, such monitoring is limited to the I/O operations from the host device issued to a storage device. Such I/O operations can be referred to as host I/O operations. Host I/O operations are issued in response to the client nodes' (e.g., from the applications/virtual machines running on the client nodes) read/write requests. However, host I/O operations may not be indicative of the performance, such as long tail latency, of the storage device. For example, if the storage device's background I/O operations may compete with the host I/O operations for resources in the storage device, the performance of the storage device can be compromised. Background I/O operations can include one or more of: a garbage collection operation, data synchronization, health check (e.g., comparing data among replicas).

Garbage collection is a background process triggered when the number of free blocks of the storage device falls below a threshold. The garbage collection process selects a candidate data block, migrates valid pages of the selected block to a free block, and erases the candidate block to free the block. As a result, the garbage collection process incurs additional background I/O and can compete for resources with the host I/O operations. Since application-level monitoring may not provide information regarding background I/O operations of the storage device, the existing monitoring services may not be able to determine the overall set of I/O load of the storage device.

To solve these problems, embodiments described herein provide a comprehensive I/O monitoring of both host and background I/O operations of a storage device. A respective storage node in the system can run a monitor, which can facilitate the comprehensive monitoring of the storage devices of that storage node. In some embodiments, the monitor can determine the I/O operations at internal channels of a storage device to facilitate the comprehensive monitoring. A respective internal channel of the storage device can correspond to a flash die of the storage device. The monitor can periodically notify the controller nodes of the system regarding the resource statistics, which includes pending host and background I/O operations, of a respective storage device of the storage node. The controller nodes can obtain this information and store the information in a resource statistics table.

The controller nodes can hierarchically determine the resource statistics, which includes pending I/O operations and associated bytes, of a respective storage node and a respective rack of the system from the obtained information. A client node can run a client library that allows the client node to request resources from the controller nodes. During operation, the client node can send a query requesting a target resource to the controller nodes for a disk operation (e.g., a read or a write operation). The request target can be the destination location of a write operation or the source location of a read operation. The controller nodes can run a global monitor, which can determine the target resource by distributing I/O requests across all storage devices in the system based on the resource statistics in the table. The global monitor can evaluate the resource statistics of a respective storage device of the system. The global monitor then selects a storage device that can efficiently operate as the target resource (e.g., the most idle storage device with the smallest set of pending I/O load).

The controller nodes then return the target resource to the client node. The client library can then send the I/O request to the storage node hosting the target resource. This allows the system to efficiently allocate resources for read/write operations in the system, thereby avoiding hot-spots in the system and reducing tail latency of the storage devices. In some embodiments, the storage device is an open-channel SSD, which allows the storage node to manage data placement inside the SSD and control I/O scheduling of both host and background I/O operations. Since an open-channel SSD can facilitate access to the internal parallelism of the SSD to the host (i.e., the channels to the flash dies within the SSD), the monitor on the storage node can collect resource statistics, thereby determining the pending host and background I/O operations.

In some embodiments, the system can be managed by a management service that provides data storage/retrieval operations. The service can be facilitated by a service application programming interface (API). The service API can be file, block, and/or object interfaces. The service can be responsible for distributing the I/O requests to the storage nodes, managing the mappings between virtual and physical page addresses (e.g., information indicating the location of the stored data), monitoring the health status of the storage and client nodes, and recovering data of any failed storage node.

Exemplary System

FIG. 1A illustrates an exemplary infrastructure facilitating efficient resource allocation based on comprehensive I/O monitoring in a distributed storage system, in accordance with an embodiment of the present application. In this example, an infrastructure 100 can include a distributed storage system 110. System 110 can include a number of client nodes (or client-serving machines) 102, 104, and 106, and a number of storage nodes 112, 114, and 116. Client nodes 102, 104, and 106, and storage nodes 112, 114, and 116 can communicate with each other via a network 120 (e.g., a local or a wide area network, such as the Internet). System 110 can also include one or more controller nodes 150, which can store and organize the metadata associated with the storage operations and the data stored.

A storage node can also include one or more storage devices. For example, storage node 116 can include components, such as a number of central processing unit (CPU) cores 141, a system memory device 142, a network interface card 143, and a number storage devices/disks 144, 146, and 148. These storage devices can be high-density non-volatile memory devices, such as NAND-based SSDs. System 110 can be managed by a management service running on controller nodes 150. The service can be responsible for distributing the I/O requests to storage nodes 112, 114, and 116, managing the mappings between virtual and physical page addresses (e.g., information indicating the location of the stored data), monitoring the health status of the storage and client nodes, and recovering data of any failed storage node.

Storage device 148 can include a number of flash dies (e.g., storage dies, such as NAND dies) 162, 163, 164, 165, 166, 167, 168, and 169. Storage device 148 can also include a controller 140, which facilitates storage and retrieval operations (e.g., encryption, compaction, cyclic redundancy check, error-correction coding, modulation, etc.). Controller 140 can include a buffer 130, which accumulates data until the data reaches a threshold, and controller 140 then transfers the data from buffer 130 to one of the flash dies. Controller 140, and flash dies 162, 163, 164, 165, 166, 167, 168, and 169 can be interconnected with each other via internal channels 161. A respective internal channel of storage device 148 can correspond to a flash die of storage device 148. For example, each of these flash dies can be coupled to an internal channel, which in turn, is coupled to a channel that reaches the other flash dies and/or controller 140.

With existing technologies, controller nodes 150 can enable I/O monitoring on storage devices of the storage devices of system 110 and allocate resources so that client nodes 102, 104, and 106 can perform read and/or write operations. Typically, such monitoring is limited to the I/O operations from a host device, such as storage node 116, issued to a storage device, such as storage device 148. These host I/O operations are issued in response to read/write requests from client nodes 102, 104, and/or 106 (e.g., from applications or virtual machines running on these client nodes). However, host I/O operations may not be indicative of the performance, such as long tail latency, of storage device 148. For example, if storage device 148's background I/O operations, such as a garbage collection operation, compete with the host I/O operations for resources in storage device 148, the performance of storage device 148 can be compromised. Since application-level monitoring may not provide information regarding background I/O operations of storage device 148, the existing monitoring services may not be able to determine the set of overall I/O load of storage device 148.

To solve these problems, system 110 can facilitate a comprehensive I/O monitoring that allows controller nodes 150 to efficiently allocate target resources for client nodes 102, 104, and/or 106. The comprehensive I/O monitoring incorporates both host and background I/O operations of a respective storage device of system 110. Storage node 116 can run a monitor 170, which can facilitate the comprehensive monitoring of storage devices 144, 146, and 148. In some embodiments, monitor 170 can determine the resource consumption associated with I/O operations at internal channels 161 of storage device 148 to facilitate the comprehensive monitoring. Monitor 170 can periodically notify controller nodes 150 regarding the resource statistics, which includes host and background I/O operations, of storage devices 144, 146, and 148.

Controller nodes 150 can obtain this information and store the information in a resource statistics table 190. During operation, client node 102 can send a query requesting a target resource for a disk operation to controller nodes 150. The target resource can be the destination location of a write operation or the source location of a read operation. Controller nodes 150 can run a global monitor 180, which can determine the target resource by distributing I/O requests across all storage devices in the system based on the resource statistics in table 190. Global monitor 180 can evaluate the resource statistics (e.g., pending I/O operations and associated bytes) of the storage devices, such as storage devices 144, 146, and 148, of system 110. Global monitor 180 then selects a storage device that can efficiently operate as the target resource (e.g., the most idle storage device with the smallest set of pending I/O load). In this way, controller nodes 150 can facilitate efficient resource allocation in system 110 based on both host and background I/O operations.

Figure 1B:
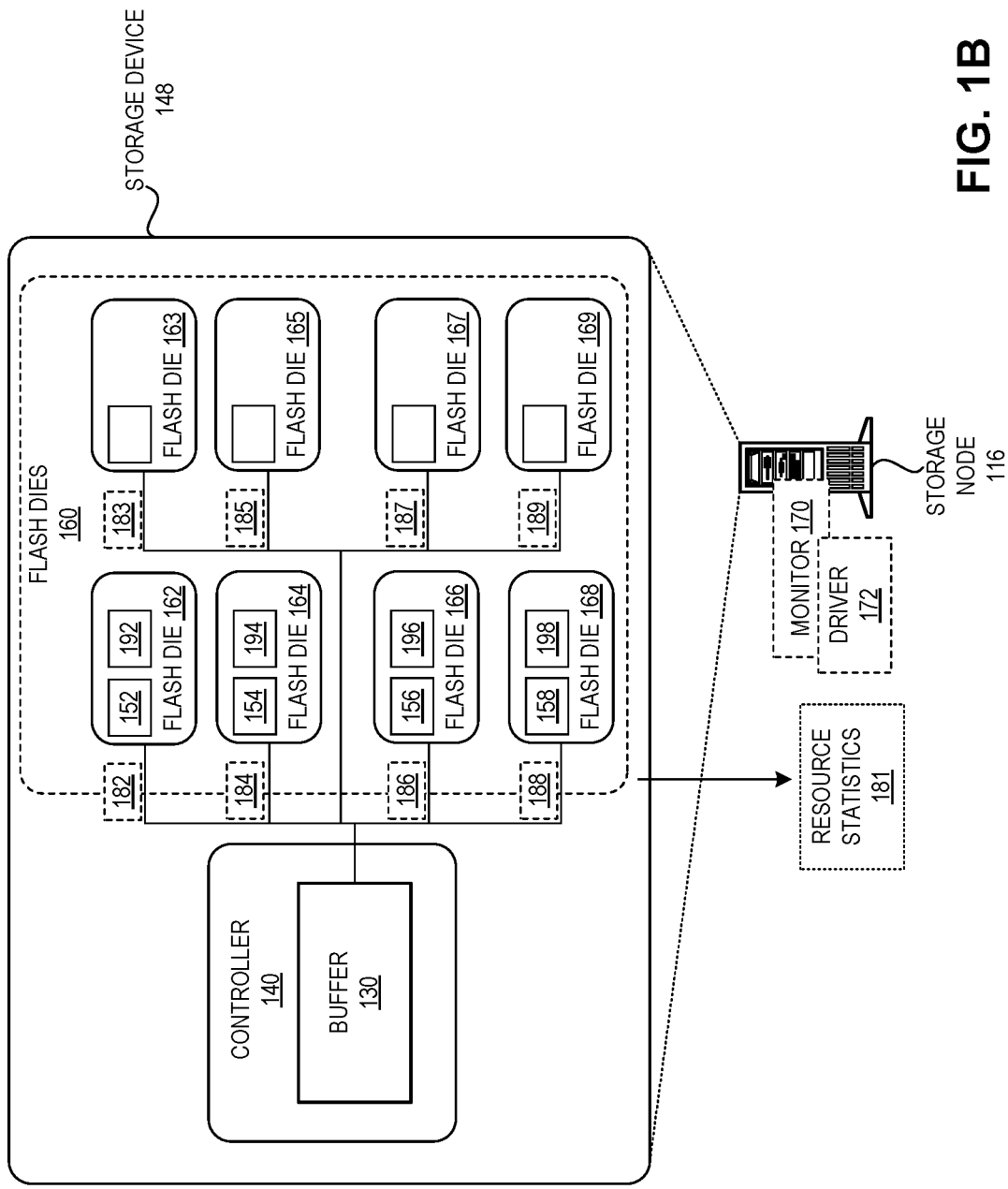
FIG. 1B illustrates an exemplary storage device supporting comprehensive I/O monitoring, in accordance with an embodiment of the present application.

FIG. 1B illustrates an exemplary storage device supporting comprehensive I/O monitoring, in accordance with an embodiment of the present application. Storage device 148 can be an open-channel SSD, which allows storage node 116 to manage data placement inside storage device 148, and control I/O scheduling of both host and background I/O operations. Since an open-channel SSD can facilitate access to internal channels 161 on storage node 116, monitor 170 on storage node 116 can collect resource statistics, thereby determining pending host and background I/O operations associated with a respective flash die of storage device 148. This allows monitor 170 to determine resource statistics 181, which can include both host and background I/O operations, of storage device 148.

Since monitor 170 can have access to internal channels 161 (e.g., via a device driver 172 of storage device 148), monitor 170 can determine resource statistics 182, 183, 184, 185, 186, 187, 188, and 189 of flash dies 162, 163, 164, 165, 166, 167, 168, and 169, respectively. Such resource statistics can include the number of pending I/O operations and bytes associated with a respective one of the operations. For example, storage node 116 can issue host I/O operations 152, 154, 156, and 158 on flash dies 162, 164, 166, and 168 respectively. Similarly, storage node 116 can schedule background I/O operations 192, 194, 196, and 198 on flash dies 162, 164, 166, and 168, respectively. Since execution of these operations is performed via driver 172, monitor 170 can determine that resource statistics 182, 184, 186, and 188 include host I/O operations 152, 154, 156, and 158, respectively, and background I/O operations 192, 194, 196, and 198, respectively. In this way, monitor 170 can perform comprehensive I/O monitoring of storage device 148 by incorporating both host and background I/O operations.

Comprehensive Monitoring and Resource Allocation

Figure 2A:
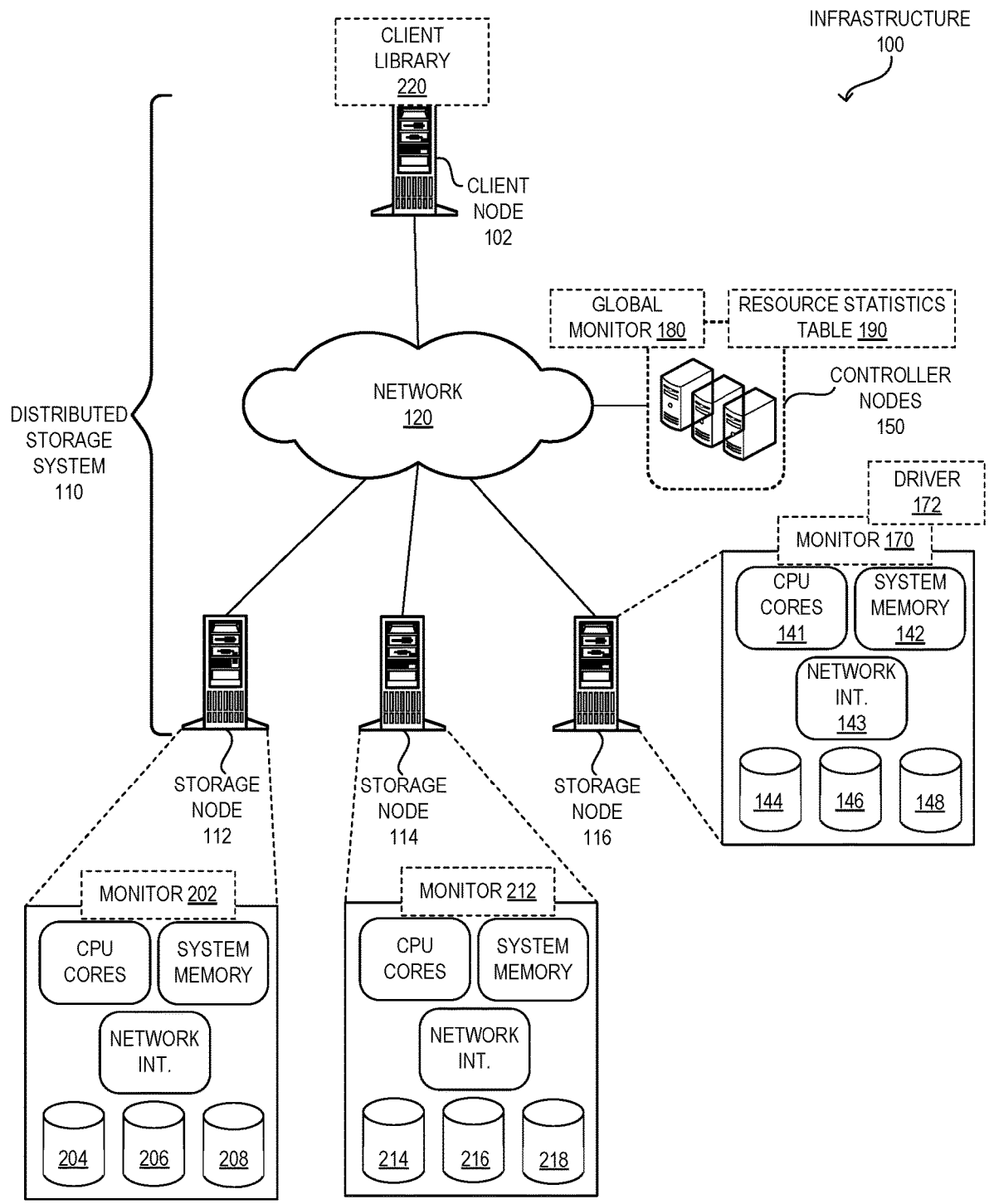
FIG. 2A illustrates exemplary elements facilitating efficient resource allocation based on comprehensive I/O monitoring in a distributed storage system, in accordance with an embodiment of the present application.

FIG. 2A illustrates exemplary elements facilitating efficient resource allocation based on comprehensive I/O monitoring in a distributed storage system, in accordance with an embodiment of the present application. The elements that facilitate the comprehensive I/O monitoring in system 110 can include client libraries on the client nodes, monitors on the storage nodes, and a global monitoring monitor, as well as a resource statistics table on the controller nodes. For example, client node 102 can run a client library 220, which allows client node 102 to request resources from controller nodes 150. Client library 220 can communicate with compute nodes 150 to determine a target resource and issue a read or write request to one or more storage nodes associated with the target resource.

During operation, client library 220 can send a query requesting a target resource to controller nodes 150. The target resource can be the destination location of a write operation or the source location of a read operation. Controller nodes 150 can run global monitor 180, which can determine the target resource by distributing I/O requests across all storage devices in system 110 based on the resource statistics in table 190. To do so, global monitor 180 can collect resource statistics on a respective disk of system 110. A monitor 202 running on storage node 112 can collect resource statistics of storage devices 204, 206, and 208 of storage node 112. Similarly, a monitor 212 running on storage node 114 can collect resource statistics of storage devices 214, 216, and 218 of storage node 114. Monitors 202, 212, and 170 then periodically report the collected resource statistics to controller nodes 150, which in turn, provide the collected resource statistics to global monitor 180.

The reporting can include generating a message, including the collected resource statistics in the message, and sending the message to controller nodes 150. Upon receiving the resource statistics, global monitor 180 can evaluate the resource statistics (e.g., pending I/O operations and associated bytes) of a respective storage device of system 110. For example, global monitor 180 can evaluate the resource statistics of storage devices 204, 206, 208, 214, 216, 218, 144, 146, and 148. Global monitor 180 then selects a storage device that can efficiently operate as the target resource (e.g., the most idle storage device with the smallest set of pending I/O load) for the query from client library 220.

If the query is for a read operation for a piece of data, global monitor 180 can select the storage device that stores one of the replicas of the piece of data and has the smallest set of pending I/O load (e.g., the fewest number of pending I/O operations, the amount of pending I/O bytes, or a weighted load thereof). If the query is for a write operation for a piece of data, global monitor 180 can determine how many replicas should be stored for that piece of data (e.g., based on an indicator in the query). Global monitor 180 then selects a set of storage devices corresponding to the number of replicas that have the smallest set of pending I/O load. Controller nodes 150 then return the target resource to client node 102, which in turn, provides the target resource to client library 220.

Client library 220 then generates an I/O request corresponding to the query. For example, if the query is for a read request, the I/O request can be a read request. Client node 102 can then send the I/O request to the storage node hosting the target resource. This allows system 110 to efficiently allocate resources for read/write operations in system 110, thereby avoiding hot-spots in system 110 and reducing tail latency of the storage devices. In some embodiments, system 110 can be managed by a management service that provides data storage/retrieval operations. The service can be facilitated by a service API. Client library 220 and driver 172 can be facilitated by the service API. The service API can be file, block, and/or object interfaces. The service can be responsible for managing the I/O operations in system 110.

Figure 2B:
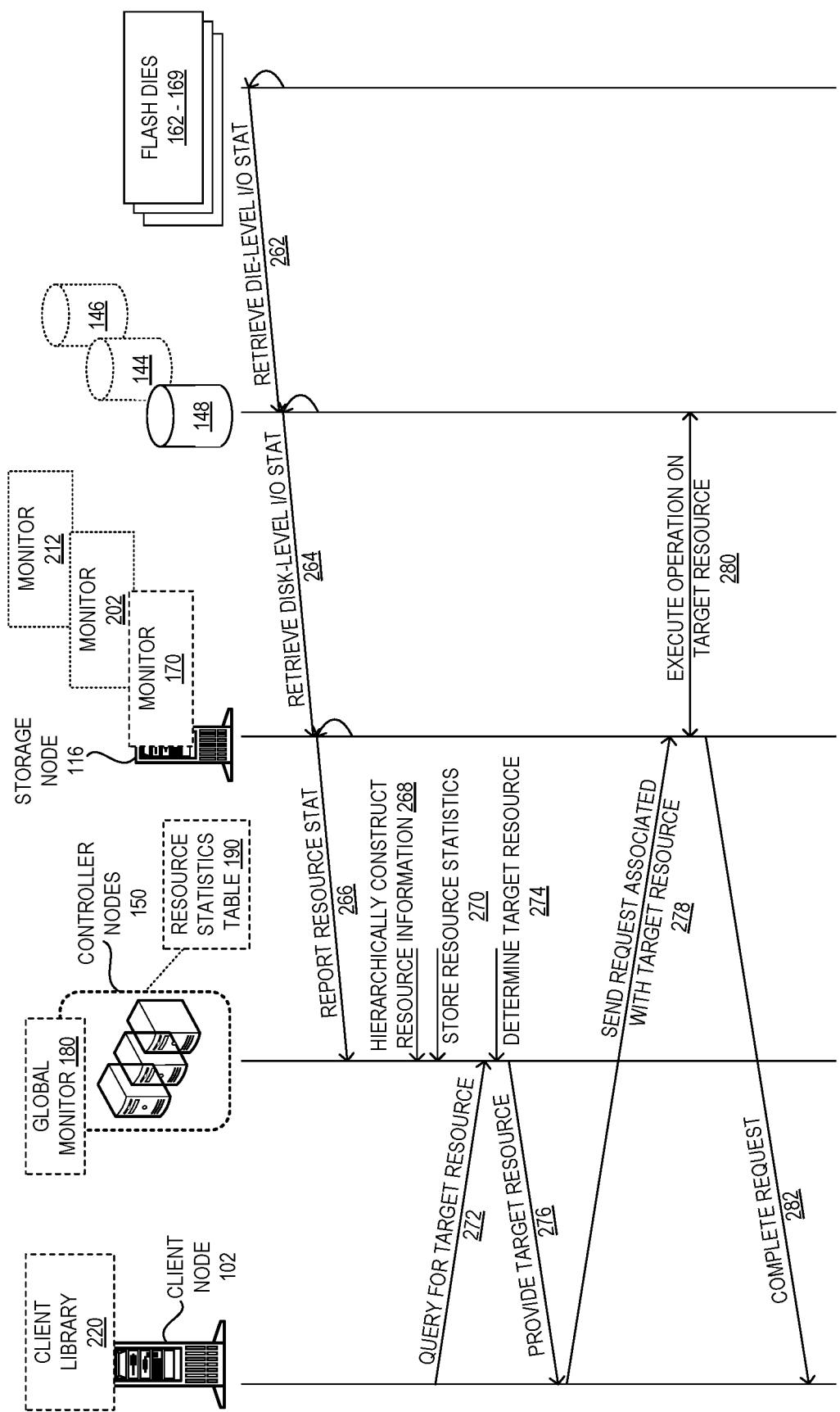
FIG. 2B illustrates exemplary communications for resource allocation in a distributed storage system based on comprehensive I/O monitoring, in accordance with an embodiment of the present application.

FIG. 2B illustrates exemplary communications for resource allocation in a distributed storage system based on comprehensive I/O monitoring, in accordance with an embodiment of the present application. During operation, monitor 170 periodically retrieves flash-die-level resource statistics (e.g., pending I/O operations) from flash dies 162-169 (operation 262). By combining the flash-die-level resource statistics, monitor 170 retrieves disk-level resource statistics for storage device 148 (operation 264). Similarly, monitor 170 can also retrieve disk-level resource statistics for storage devices 144 and 146. Monitor 170 then reports the resource statistics (e.g., by sending a message comprising the resource statistics) to controller nodes 150 (operation 266). In the same way, monitors 202 and 212 also report their respective resource statistics to controller nodes 150.

Global monitor 180 on controller nodes 150 can then hierarchically construct resource information from the received resource statistics (operation 268). For example, from the disk-level resource statistics, global monitor 180 can construct node-level resource statistics, and from the node-level statistics, global monitor 180 can construct rack-level resource statistics. Global monitor 180 can store the resource statistics of different levels (e.g., from rack-level to flash-die-level) in table 190 (operation 270). To issue a request for an I/O operation, client library 220 of client node 102 can send a query for a target resource to controller nodes 150 (operation 272). Global monitor 180 can determine the target resource based on the resource statistics of table 190 (operation 274).

Global monitor 180 can determine the disk and/or flash die with the smallest set of I/O load as a target resource. In some embodiments, global monitor 180 determines the I/O load of a disk and/or flash die by calculating a weighted load. For example, the weighted load, L, can be calculated as:

$$L=HW*HWW+HR*HRW+BW*BWW+BR*BRW.$$

Here, HW indicates pending host write operations, HWW indicates a weight of the pending host write operations, HR indicates pending host read operations, and HRW indicates a weight of the pending host read operations. Similarly, BW indicates pending background write operations, BWW indicates a weight of the pending background write operations, BR indicates pending background read operations, and BRW indicates a weight of the pending background read operations. Here, each type I/O operation may be assigned a different weight to reflect different amounts of resource consumption. Furthermore, global monitor 180 can allocate (e.g., based on a user configuration) a higher weight for host operations than background operations.

Global monitor 180 then provides the target resource to client node 102 (operation 276). Global monitor 180 can specify the target location (e.g., up to data page and/or block level) for a read operation, or a number of target locations corresponding to multiple replicas for a write operation. Suppose that the target resource indicates a location on storage device 148. Upon receiving the target resource, client node 102 can send a request (e.g., a request for a read or a write operation) associated with the target resource to storage node 116 (operation 278). Storage node 116 can execute the operation on the target resource (operation 280). Storage node 116 then completes the request (operation 282). The completion can include sending retrieved data from the target resource for a read operation to client node 102, an acknowledgment of a successful write operation, or an error message indicating an error in the execution of the operation.

A Set of Pending Load

FIG. 3 illustrates an exemplary resource mapping table storing comprehensive resource statistics in a distributed storage system, in accordance with an embodiment of the present application. Controller nodes 150 can maintain resource statistics table 190, which indicates sets of pending I/O load of a respective storage device of system 110. Table 190 can be a table in a resource database 300 (e.g., a relational database or any other data structure). Table 190 can include a number of columns: a rack 302, a node 304, a storage device 306, and resource statistics 308. These columns can establish a mapping relationship among these entities of system 110. The mapping relationship allows global monitor 180 to store the resource statistics of different levels in table 190.

In this example, table 190 can store a set of host write/read (w/r) load 322 and a set of background w/r load 324 for storage device 204 of storage node 112, which can be in a rack 312 of system 110. Similarly, table 190 can store a set of host write/read load and a set of background w/r load for storage devices 206 and 208 of storage node 112. Table 190 can also store a set of host w/r load 326 and a set of background w/r load 328 for storage device 214 of storage node 114, which can also be in rack 312 of system 110. Similarly, table 190 can store a set of host w/r load and a set of background w/r load for storage devices 216 and 218 of storage node 114. Rack 312 can include other storage nodes.

Furthermore, table 190 can also store a set of host w/r load 341 and a set of background w/r load 342 for storage device 144 of storage node 116, which can be in a rack 314 of system 110. Table 190 can also store a set of host w/r load 343 and a set of background w/r load 344 for storage device 146, and a set of host w/r load 345 and a set of background w/r load 346 for storage device 148. For example, the set of host w/r load 341 can include 16 megabytes (MB) and 32 MB for write and read, respectively; and the set of background w/r load 342 can include 128 MB and 128 MB for write and read, respectively. On the other hand, the set of host w/r load 343 can include 64 MB and 64 MB for write and read, respectively; and the set of background w/r 344 can include 32 MB and 16 MB for write and read, respectively.

Here, even though storage device 146 has a higher set of host I/O load than that of storage device 144, the set of overall I/O load of storage device 146 is lower than that of storage device 144. Based on the information in table 190, global monitor 180 can select a target resource based on the overall set of I/O load of a storage device. It should be noted that, even though table 190 shows the pending I/O operations/bytes at disk level, table 190 can further include pending I/O operations/bytes at flash die level. For example, the set of host w/r load 345, and the set of background w/r load 346 can be further divided to incorporate pending I/O operations/bytes 182, 183, 184, 185, 186, 187, 188, and 189 of flash dies 162, 163, 164, 165, 166, 167, 168, and 169, respectively, in table 190. This can allow global monitor 180 to determine a flash die that may have the smallest set of pending I/O load (i.e., the idlest flash die) as a target resource based on table 190.

Figure 4:
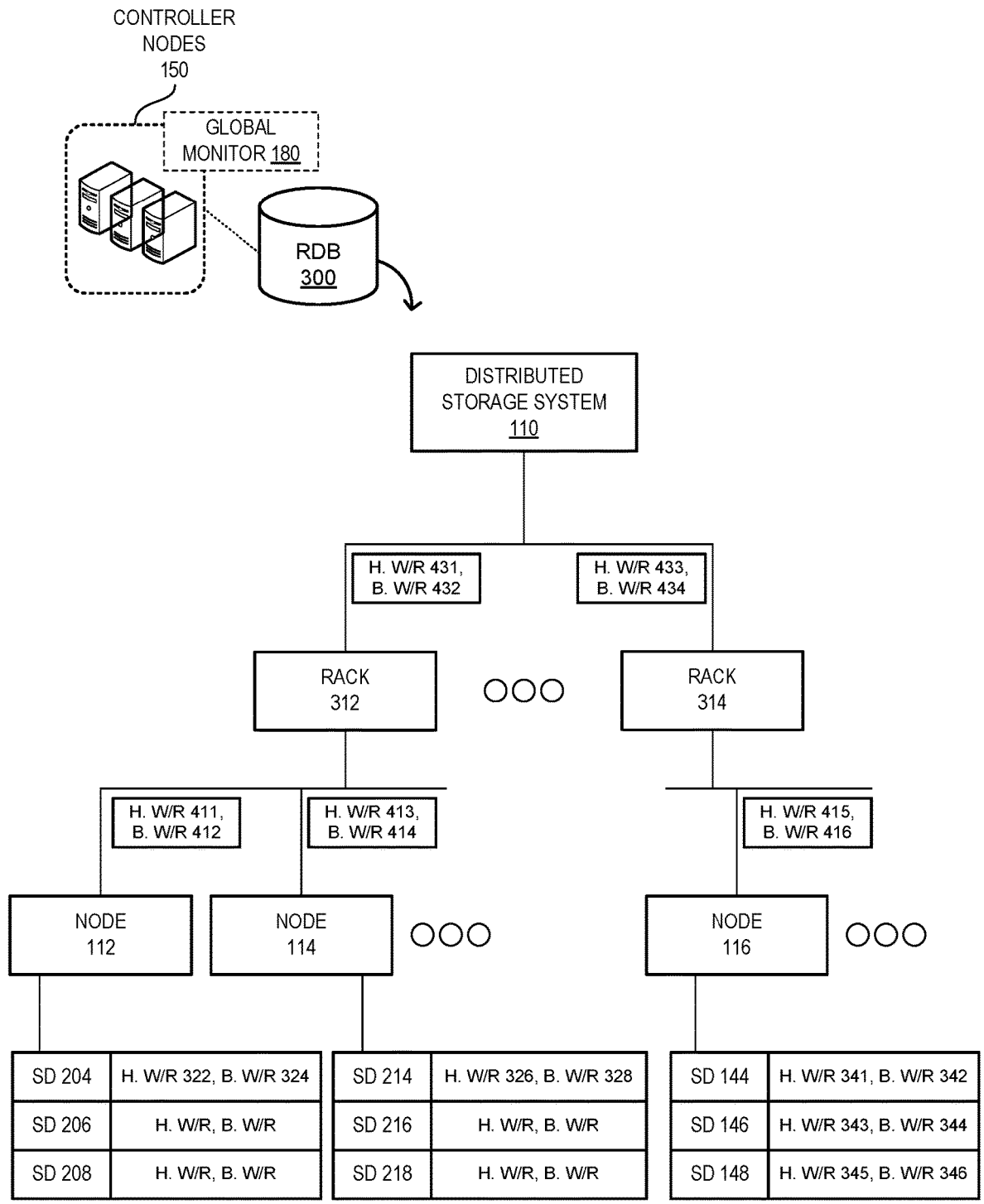
FIG. 4 illustrates an exemplary hierarchical distribution of comprehensive resource statistics in a distributed storage system, in accordance with an embodiment of the present application.

FIG. 4 illustrates an exemplary hierarchical distribution of comprehensive pending I/O operations in a distributed storage system, in accordance with an embodiment of the present application. During operation, global monitor 180 can hierarchically determine the resource statistics (e.g., calculate the pending I/O operations) of a respective storage node and a respective rack of system 110 from the die-level and/or disk-level resource statistics. Global monitor 180 can determine a set of host w/r load 415 of storage node 116 by combining sets of host w/r load 341, 343, and 345 of storage devices 144, 146, and 148, respectively. Similarly, global monitor 180 can determine a set of background w/r load 416 of storage node 116 by combining sets of background w/r load 342, 344, and 346 of storage devices 144, 146, and 148, respectively.

In the same way, global monitor 180 can determine sets of host and background w/r loads 411 and 412, respectively, of storage node 112 by combining sets of host and background w/r load, respectively, of storage devices 204, 206, and 208. Global monitor 180 can also determine sets of host and background w/r loads 413 and 414, respectively, of storage node 114 by combining sets of host and background w/r loads, respectively, of storage devices 214, 216, and 218. Global monitor 180 can store sets of host w/r loads 411, 413, and 415, and sets of background w/r loads 412, 414, and 416 in resource database 300.

Continuing with the hierarchical determination of resource statistics, global monitor 180 can determine sets of host and background w/r load 431 and 432, respectively, of rack 312 by combining sets of host and background w/r load, respectively, of storage nodes 112, 114, and other storage nodes, if any, of rack 312. Global monitor 180 can also determine sets of host and background w/r load 433 and 434, respectively, of rack 314 by combining sets of host and background w/r load, respectively, of storage node 116 and other storage nodes, if any, of rack 314. Global monitor 180 can store sets of host w/r load 431 and 413, and sets of background w/r load 432 and 434 in resource database 300. In this way, global monitor 180 can hierarchically determine the resource statistics of system 110 from the die-level and/or disk-level resource statistics collected from the monitors on the storage nodes.

Operations

Figure 5A:
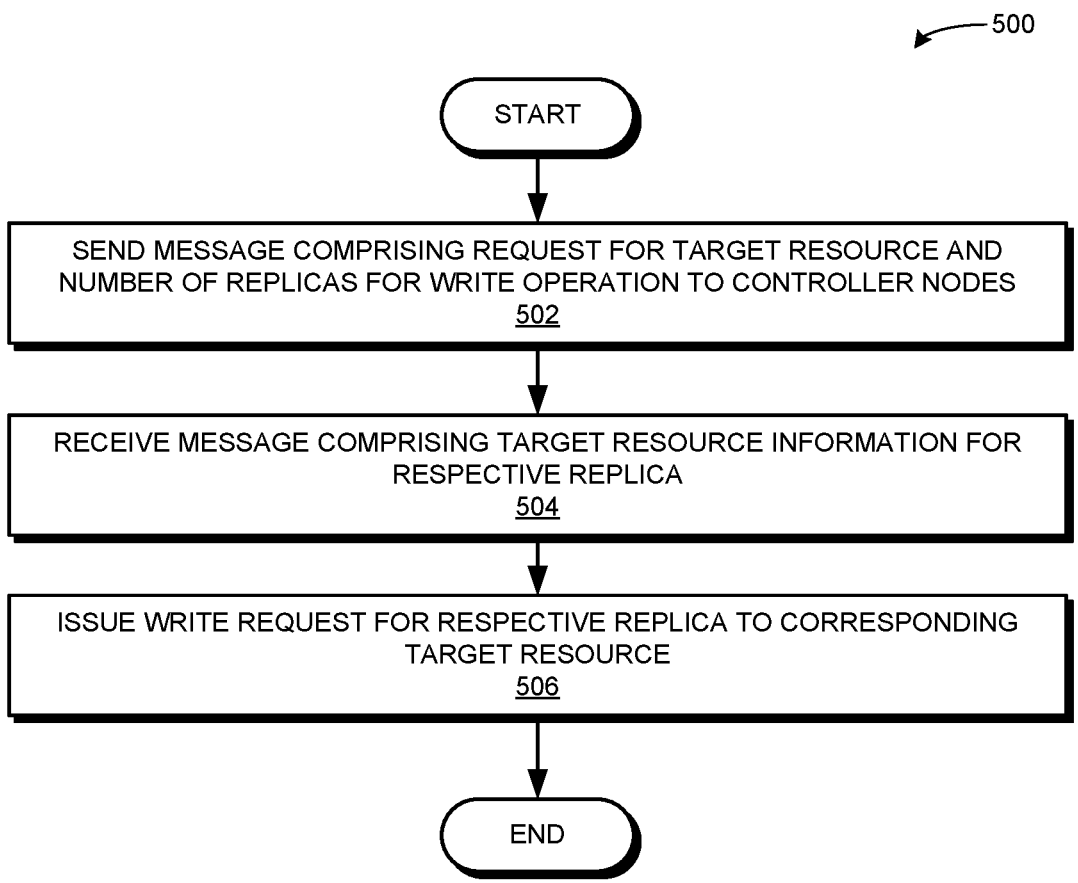
FIG. 5A presents a flowchart illustrating a method of a client node performing a write operation in a distributed storage system, in accordance with an embodiment of the present application.

FIG. 5A presents a flowchart 500 illustrating a method of a client node performing a write operation in a distributed storage system, in accordance with an embodiment of the present application. One or more operations of the method can be executed by a client library running on the client node. During operation, the client node sends a message comprising a request for a target resource and a number of replicas for the write operation to the controller nodes (operation 502). The client node then receives a message comprising the target resource information for a respective replica (operation 504). The target resource information can include locations indicating a destination physical data page and/or block of a storage device of a storage node for a respective replica. The client node then issues a write request for a respective replica to the corresponding target resource (operation 506).

Figure 5B:
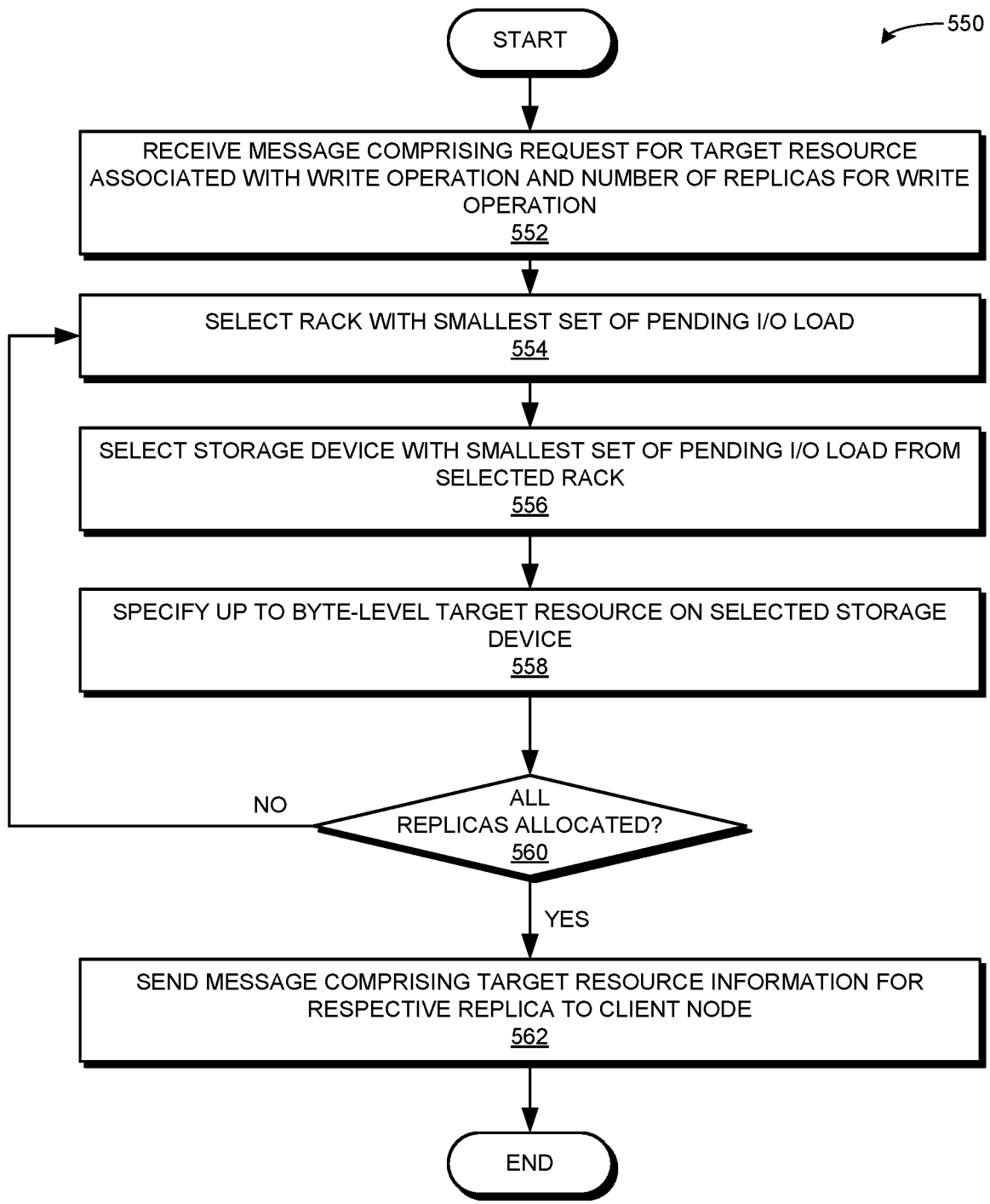
FIG. 5B presents a flowchart illustrating a method of one or more controller nodes allocating resources for a write operation based on comprehensive I/O monitoring in a distributed storage system, in accordance with an embodiment of the present application.

FIG. 5B presents a flowchart 550 illustrating a method of one or more controller nodes allocating resources for a write operation based on comprehensive I/O monitoring in a distributed storage system, in accordance with an embodiment of the present application. One or more operations of the method can be executed by a global monitor running on the controller nodes. During operation, the controller nodes receive a message comprising a request for a target resource associated with a write operation and a number of replicas for the write operation (operation 552). The controller nodes then select a rack with the smallest set of pending I/O load (e.g., the fewest number of pending I/O operations and/or associated bytes) (operation 554) and select a storage device with the smallest set of pending I/O load from the selected rack (operation 556).

The controller nodes can specify up to a byte-level target resource (i.e., resource location) on the selected storage device (operation 558). The controller nodes can determine whether all replicas have been allocated (operation 560). If all replicas have not been allocated, the controller nodes continue to select a rack with the smallest set of pending I/O load for the next replica (operation 554). On the other hand, if all replicas have been allocated, the controller nodes send a message comprising the target resource information for a respective replica (operation 562).

Figure 6A:
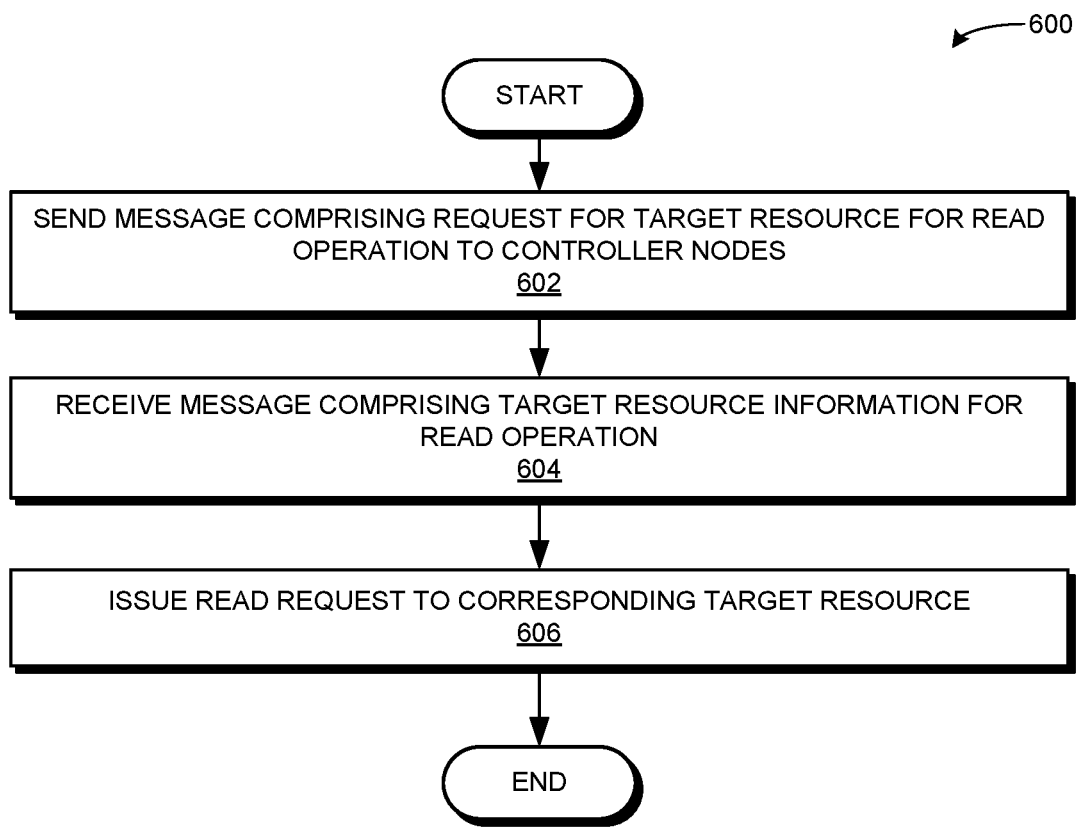
FIG. 6A presents a flowchart illustrating a method of a client node performing a read operation in a distributed storage system, in accordance with an embodiment of the present application.

FIG. 6A presents a flowchart 600 illustrating a method of a client node performing a read operation in a distributed storage system, in accordance with an embodiment of the present application. One or more operations of the method can be executed by a client library running on the client node. During operation, the client node sends a message comprising a request for a target resource for the read operation to the controller nodes (operation 602). The client node then receives a message comprising the target resource information for the read operation (operation 604). The target resource information can include a location indicating a physical data page and/or block of a storage device of a storage node that stores a replica of the piece of data requested by the read operation. The client node then issues a read request to the corresponding target resource (operation 606).

Figure 6B:
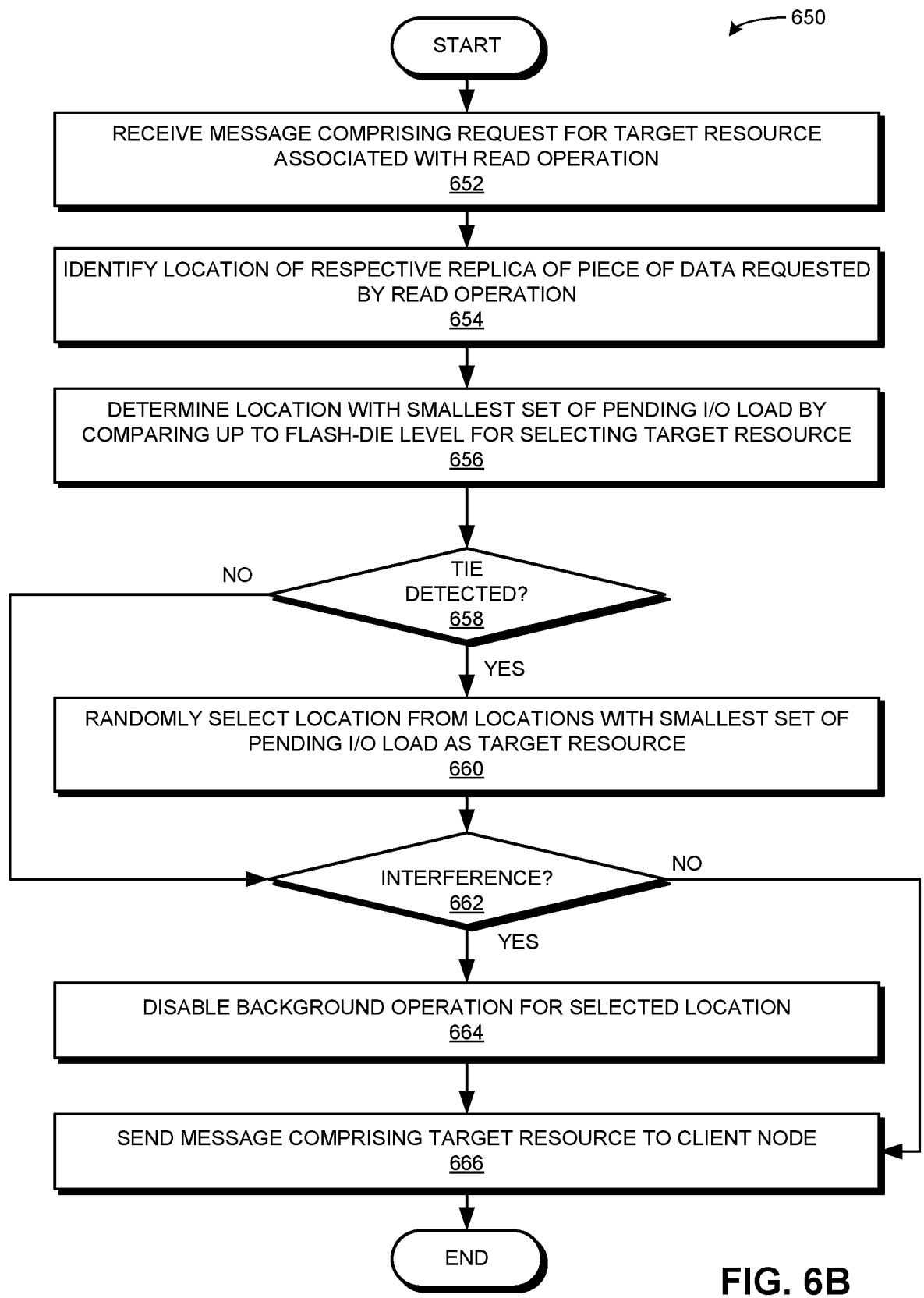
FIG. 6B presents a flowchart illustrating a method of one or more controller nodes allocating resources for a read operation based on comprehensive I/O monitoring in a distributed storage system, in accordance with an embodiment of the present application.

FIG. 6B presents a flowchart 650 illustrating a method of one or more controller nodes allocating resources for a read operation based on comprehensive I/O monitoring in a distributed storage system, in accordance with an embodiment of the present application. One or more operations of the method can be executed by a global monitor running on the controller nodes. During operation, the controller nodes receive a message comprising a request for a target resource associated with a read operation (operation 652). The controller nodes identify the location of a respective replica of the piece of data requested by the read operation (operation 654). The controller nodes then determine the location with the smallest set of pending I/O load by comparing up to flash-die level for a selecting target resource (operation 656).

The controller nodes determine whether a tie is detected in the selection (operation 658). The tie can indicate that at least two flash dies, storage devices, storage nodes, and/or racks that store a replica have the same smallest sets of pending I/O load. If a tie is detected, the controller nodes can randomly select a location from the locations with the smallest sets of pending I/O load as the target resource (operation 660). If a tie is not detected (operation 658) or upon randomly selecting a location (operation 660), the controller nodes can also determine whether a scheduled background operation may interfere with the read (operation 662). If interference is detected, the controller nodes can disable the background operation(s) for the selected location (operation 664). If interference is not detected (operation 662) or upon disabling the background operation(s) (operation 664), the controller nodes send a message comprising the target resource to the client node (operation 666).

Exemplary Computer System and Apparatus

Figure 7:
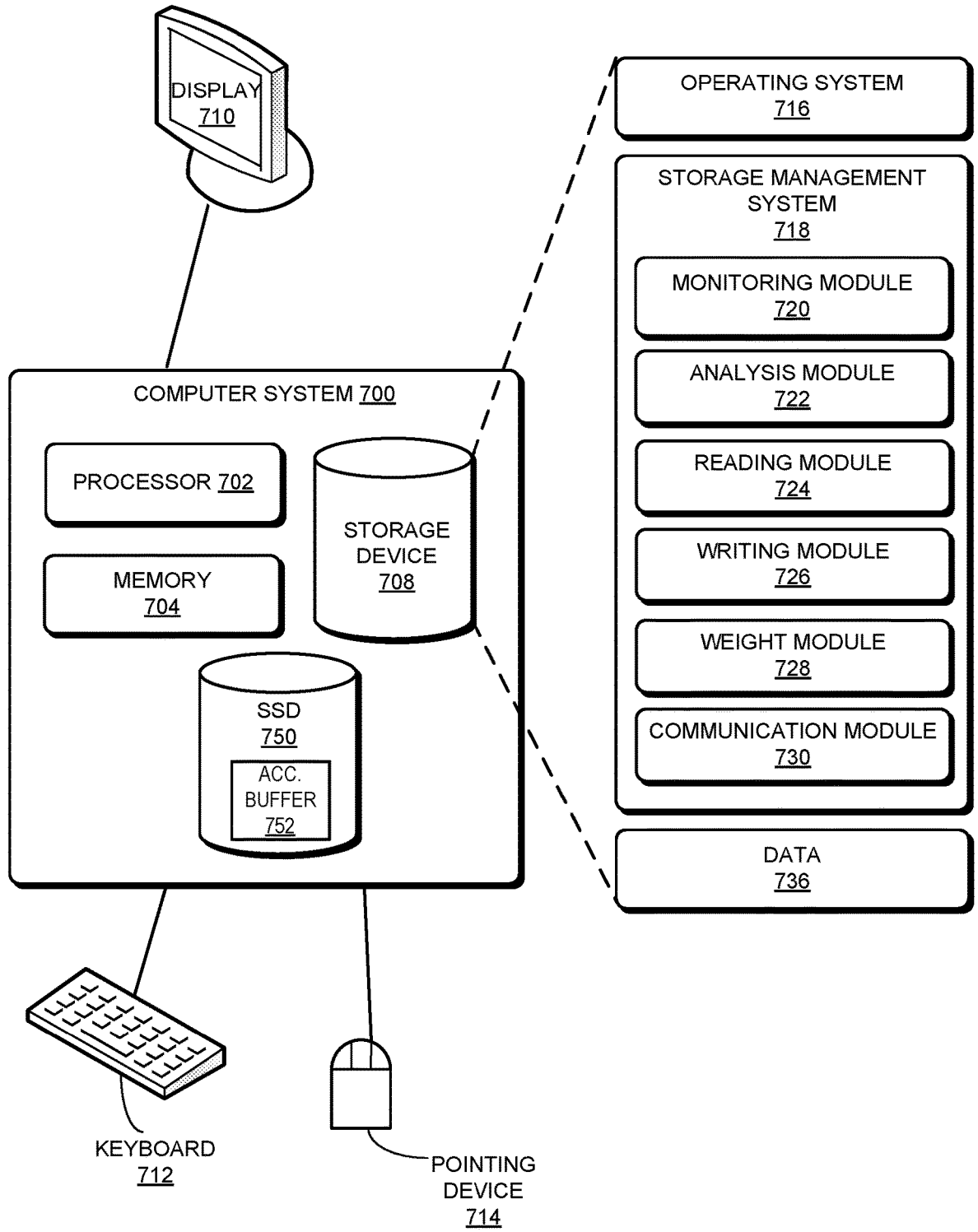
FIG. 7 illustrates an exemplary computer system that facilitates efficient resource allocation based on comprehensive I/O monitoring in a distributed storage system, in accordance with an embodiment of the present application.

FIG. 7 illustrates an exemplary computer system that facilitates efficient resource allocation based on comprehensive I/O monitoring in a distributed storage system, in accordance with an embodiment of the present application. Computer system 700 includes a processor 702, a memory device 704, and a storage device 708. Memory device 704 can include a volatile memory (e.g., a dual in-line memory module (DIMM)). Furthermore, computer system 700 can be coupled to a display device 710, a keyboard 712, and a pointing device 714. Storage device 708 can store an operating system 716, a storage management system 718, and data 736. Storage management system 718 can facilitate the operations of one or more of: client node 102, storage node 116, and controller nodes 150. Storage management system 718 can include circuitry to facilitate these operations.

Storage management system 718 can also include instructions, which when executed by computer system 700 can cause computer system 700 to perform methods and/or processes described in this disclosure. Specifically, storage management system 718 can include instructions for monitoring resource statistics (e.g., pending I/O operations and associated bytes) in a storage device (monitoring module 720). Storage management system 718 can also include instructions for reporting the resource statistics to controller nodes (monitoring module 720). Furthermore, storage management system 718 includes instructions for storing the obtained resource statistics in a resource database (analysis module 722). Storage management system 718 can also include instructions for hierarchically determining the resource statistics of a respective storage node and a respective rack of the distributed storage system from the obtained resource statistics (analysis module 722).

Moreover, storage management system 718 includes instructions for determining a target resource for a read operation by determining the location that is associated with the smallest set of pending I/O load and storing a replica (reading module 724). Storage management system 718 further includes instructions for determining target resources for a write operation by determining a location with the smallest set of pending I/O load for a respective replica (writing module 726). Storage management system 718 can also include instructions for determining the set of pending I/O load by calculating a weighted set of load based on pending sets of host and background read and write load (weight module 728). Storage management system 718 may further include instructions for sending and receiving messages (communication module 730). Data 736 can include any data that can facilitate the operations of storage management system 718, such as resource statistics 181 and resource statistics table 190.

Figure 8:
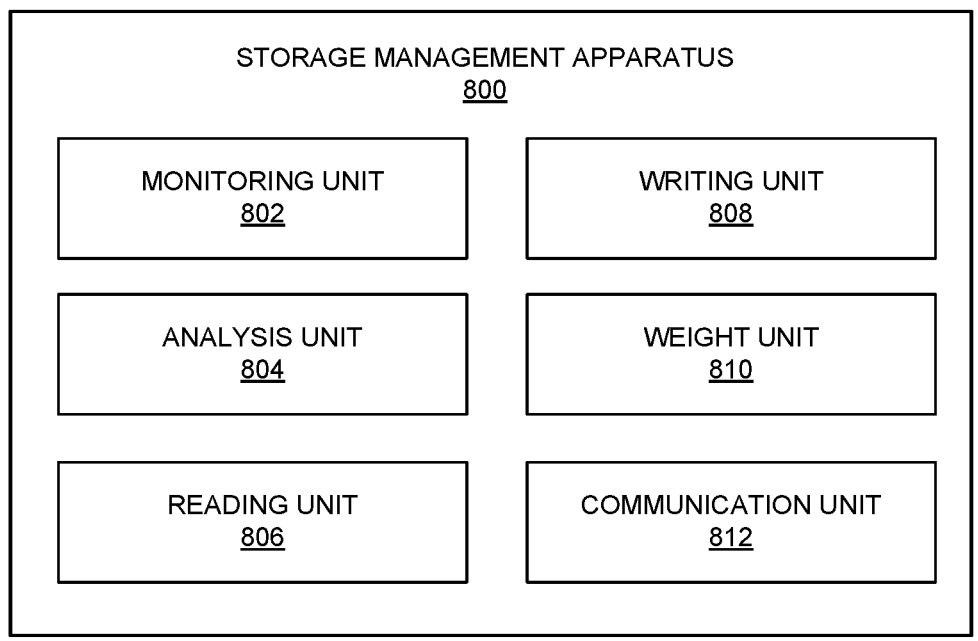
FIG. 8 illustrates an exemplary apparatus that facilitates efficient resource allocation based on comprehensive I/O monitoring in a distributed storage system, in accordance with an embodiment of the present application.

FIG. 8 illustrates an exemplary apparatus that facilitates efficient resource allocation based on comprehensive I/O monitoring in a distributed storage system, in accordance with an embodiment of the present application. Storage management apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can include units 802-812, which perform functions or operations similar to modules 720-730 of computer system 700 of FIG. 7, including: a monitoring unit 802; an analysis unit 804; a reading unit 806; a writing unit 808; a weight unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method, comprising:
   monitoring internal channels of a storage device of a computing device in a distributed storage system, wherein a respective internal channel is coupled to a storage die of the storage device;
   determining a set of pending load on the storage device based on the monitoring of the internal channels, wherein the set of pending load includes a set of load from host operations and a set of load from background operations measured on the internal channels of the storage device; and
   sending, to a remote device, information indicating the set of pending load for distributing incoming requests in the distributed storage system.

2. The method of claim 1, wherein the storage device includes a plurality of storage dies coupled to each other via internal channels, and
   wherein determining the set of pending load on the storage device further comprises determining sets of load from host operations and background operations on a respective storage die of the plurality of storage dies.

3. The method of claim 1, wherein the set of pending load indicates input/output (I/O) bytes for pending read and write operations associated with host and background operations on the storage device.

4. The method of claim 1, wherein the background operations include one or more of: a garbage collection operation, data synchronization, and health check of data in the distributed storage system.

5. The method of claim 1, further comprising:
   determining a second set of pending load on a second storage device of the computing device measured on internal channels of the second storage device; and sending information indicating the second set of pending load for distributing incoming requests among the storage device and the second storage device based on the set of pending load and the second set of pending load.

6. The method of claim 1, wherein the storage device is an open-channel solid-state drive (SSD), and wherein monitoring the storage device further comprises monitoring the host operations and the background operations managed by a device driver of the storage device.

7. A method, comprising:
receiving information indicating sets of pending load of a plurality of storage devices from one or more storage nodes of a distributed storage system, wherein a set of pending load of a respective storage device includes a set of load from host operations and a set of load from background operations measured on internal channels of the storage device, wherein a respective internal channel is coupled to a storage die of the storage device;
receiving a request for a target resource associated with a disk operation from a client node of the distributed storage system;
selecting, from the plurality of storage devices, a storage device with a smallest set of pending load in the sets of pending load as the target resource; and
sending the target resource to the client node.

8. The method of claim 7, wherein selecting the storage device further comprises:
determining that the storage device and a second storage device have the smallest set of pending load;
comparing respective sets of pending load on storage dies of the storage device and the second storage device; and
randomly selecting the storage device as the target resource in response to detecting a tie in the comparison.

9. The method of claim 7, wherein the background operations include one or more of: a garbage collection operation, data synchronization, and health check of data in the distributed storage system.

10. The method of claim 7, wherein the disk operation is a read operation for a piece of data, and wherein the target resource indicates a source location of at least one replica from a set of replicas of the piece of data in the distributed storage system.

11. The method of claim 7, wherein the disk operation is a write operation for a piece of data, and wherein the target resource indicates a destination location of a set of replicas of the piece of data in the distributed storage system.

12. The method of claim 7, further comprising hierarchically determining sets of pending load on entities of the distributed storage system from the received information.

13. The method of claim 7, wherein a respective storage device of the plurality of storage devices includes a plurality of storage dies coupled to each other via internal channels, and
wherein the sets of pending load of the plurality of storage devices include sets of load from host operations and background operations on a respective storage die of the plurality of storage dies.

14. A computer system, comprising:
a processor; and
a memory coupled to the processor and storing instructions, which when executed by the processor cause the processor to perform a method, the method comprising:
receiving information indicating sets of pending load of a plurality of storage devices from one or more storage nodes of a distributed storage system, wherein a set of pending load of a respective storage device includes a set of load from host operations and a set of load from background operations measured on internal channels of the storage device, wherein a respective internal channel is coupled to a storage die of the storage device;
receiving a request for a target resource associated with a disk operation from a client node of the distributed storage system;
selecting, from the plurality of storage devices, a storage device with a smallest set of pending load in the sets of pending load as the target resource; and
sending the target resource to the client node.

15. The computer system of claim 14, wherein selecting the storage device further comprises:
determining that the storage device and a second storage device have the smallest set of pending load;
comparing respective sets of pending load on storage dies of the storage device and the second storage device; and
randomly selecting the storage device as the target resource in response to detecting a tie in the comparison.

16. The computer system of claim 14, wherein the background operations include one or more of: a garbage collection operation, data synchronization, and health check of data in the distributed storage system.

17. The computer system of claim 14, wherein the disk operation is a read operation for a piece of data, and wherein the target resource indicates a source location of at least one replica from a set of replicas of the piece of data in the distributed storage system.

18. The computer system of claim 14, wherein the disk operation is a write operation for a piece of data, and wherein the target resource indicates a destination location of a set of replicas of the piece of data in the distributed storage system.

19. The computer system of claim 14, wherein the method further comprises hierarchically determining sets of pending load on entities of the distributed storage system from the received information.

20. The computer system of claim 14, wherein a respective storage device of the plurality of storage devices includes a plurality of storage dies coupled to each other via internal channels, and
wherein the sets of pending load of the plurality of storage devices include sets of load from host operations and background operations on a respective storage die of the plurality of storage dies.

* * * * *